United States Patent Office 2,802,789
Patented Aug. 13, 1957

2,802,789

POLYOXYPROPYLENE GLYCOL DISULFATE DETERGENT COMPOSITIONS

Richard D. Stayner, Berkeley, Calif., assignor to California Research Corporation, San Francisco, Calif., a corporation of Delaware No Drawing. Application December 21, 1954, Serial No. 476,833

4 Claims. (Cl. 252—138)

This invention relates to the preparation of novel synthetic detergent compositions, and more particularly to detergent compositions in which the surface-active agent or active detergent component is a high molecular weight polyoxypropylene glycol disulfate.

Surface-active agents may be classified generally as being either of the ionic or non-ionic type. The ionic type of surface-active agent invariably consists of a large hydrophobic group, such as a high molecular weight alkyl or alkyl aromatic hydrocarbon radical, which is attached to a small hydrophilic group such as a carboxy, sulfonic acid, or sulfuric ester group of the anionic class; or a primary, secondary, tertiary amino or a quaternary ammonium group of the cationic class. Non-ionic surface-active agents likewise are characterized by a large hydrophobic group, such as a high molecular weight alkyl or alkyl aromatic hydrocarbon radical which is attached to a polyoxyalkylene ether type hydrophilic group, such as the polyoxyethylene glycol group. In general, surface-active agents known heretofore have also consisted of either a single hydrophilic group or closely positioned hydrophilic groups when more than one was present.

I have now discovered a superior heavy duty detergent composition comprising surface-active material of a new class of anionic surface-active agents and an alkaline phosphate salt. More specifically, the new class of surface-active agents are, suitable salts, e. g., the alkali metal salts, of polyoxypropylene glycol bis sulfuric esters, in which the polyoxypropylene group has a molecular weight ranging from above about 1000 to 3000.

The salts of polyoxypropylene glycol bis sulfuric esters may be prepared in accordance with the teaching of my copending application Serial No. 294,488, filed June 19, 1952, and now abandoned. That is, the novel active detergent component of the invention can be prepared by sulfating a polyoxypropylene glycol having a molecular weight ranging above about 1000 to about 3000, the resulting sulfuric esters being then neutralized with a basic compound to form the salts thereof. In the preparation of polyoxypropylene glycol conventional methods are employed, such as by the condensation of 1,2-propylene oxide with the corresponding glycol or with small amounts of water. The more suitable polyoxypropylene glycols range in molecular weight from about 1500 to 2500, and preferably have a molecular weight around 2000. Likewise conventional are the conditions of sulfation. Thus, sulfation may be effected at a temperature from about 0° C. to 50° C. with a suitable sulfating agent employed in a mol ratio to the glycol of 2 to 1 and higher, suitable sulfating agents including concentrated sulfuric acid, fuming sulfuric acid or oleum, chlorosulfonic acid and sulfur trioxide alone or with suitable solvents, such as sulfur dioxide, dioxane or pyridine. Following sulfation, the polyoxypropylene sulfuric esters are neutralized with stoichiometric amounts of a suitable base reacting material, e. g., the alkali metal hydroxides or carbonates. Suitable neutralizing agents include sodium hydroxide, potassium hydroxide, sodium carbonates, potassium carbonate, and the like. Examples of other suitable neutralizing agents are basic nitrogen compounds, such as ammonia, ammonium hydroxide, amines, alkanol amines, and the like.

In order to further illustrate the preparation of the polyoxypropylene disulfates contemplated by the invention, the following examples are given, the proportions being on a weight basis:

Example 1

100 grams of polyoxypropylene glycol of approximately 2000 mol weight were dissolved in 50 ml. of methylene chloride. The solution was cooled to 0° C., and then 12 grams of chlorosulfonic acid were added dropwise while stirring at 0 to 10° C. After the addition of the chlorosulfonic acid, nitrogen was bubbled through the stirred solution to remove the hydrogen chloride. The product was neutralized by pouring the solution into aqueous sodium hydroxide and then evaporated to dryness. The pale-yellow colored product was completely soluble in water and its dilute aqueous solutions foamed upon agitation.

Percent sulfur (calc.) = 2.90
Percent sulfur (found) = 2.72

Example 2

In the same manner as in Example 1, above, 100 grams of polypropylene glycol having a molecular weight of about 1025 were dissolved in 50 ml. of methylene chloride. The solution was cooled to 0° C. To the stirred solution was added 11.4 grams of chlorosulfonic acid while maintaining the temperature at 0 to 10° C. After removing hydrogen chloride by blowing the mixture with nitrogen, the product was neutralized by pouring it into a solution of sodium hydroxide. Methylene chloride was removed by evaporation and the aqueous solution of the product was diluted with an equal volume of ethyl alcohol. After extraction with petroleum ether to remove unreacted polypropylene glycol, the aqueous alcoholic solution was then evaporated to dryness to give 78 grams of a colorless tacky solid. This material displayed foaming and detergent properties when tested in the laundering of soiled cotton fabric.

Example 3

In accordance with the method of Example 2, above, a 100 gram portion of polypropylene glycol having a molecular weight of about 2000 was sulfated with 58 grams of chlorosulfonic aicd and purified. 83 grams of product were thus obtained in the form of a colorless tacky solid displaying foaming and detergent properties in laundering tests.

As hereinabove indicated, the heavy duty detergent compositions of the present invention contain the two essential ingredients of (1) a polyoxypropylene glycol disulfate having a molecular weight above 1000, preferably from 1500 up to 3000, most advantageously, up to 2500; and (2) a phosphate builder salt capable of acting as a sequestering agent for hard water ions.

A satisfactory two-component detergent composition comprises, by weight, from about 10 to 40 parts of the polyoxypropylene glycol disulfate, preferably 15 to 30 parts, and 90 to 60 parts, preferably 85 to 70 parts of the phosphate salt. While the preferred phosphate builder is sodium tripolyphosphate, other phosphate salts give satisfactory results. These include tetrasodium pyrophosphate and sodium hexametaphosphate. The corresponding ammonium and potassium salts are also satisfactory.

The two-component detergent composition thus prepared is characterized by a relatively low degree of foaming which is desired in certain applications, such as in dishwashing and tumbler type washing machines, and good detergency.

In order to evaluate the detergency effectiveness of the two-component system above described, a series of tests were run according to the well-known Launder-O-Meter procedure, described, for example, in the book by J. C. Harris, "Detergency Evaluation and Testing," Interscience Manual 4, published by Interscience Publishers, Inc., New York, 1954. The tests had for their purpose the determination of soil removal from cotton which had been soiled with an oily soil. In all tests the detergent composition was employed in a concentration of 0.2% in hard water of 300 p. p. m. (300 p. p. m. Ca-Mg, calculated as $CaCO_3$ and $MgCO_3$ in a weight ratio of 2:1).

| Test No. | Formula | Percent Soil Removal |
|---|---|---|
| 1 | 30% Disodium polyoxypropylene glycol disulfate, molecular weight about 2,000; 70% sodium tripolyphosphate. | 61 |
| 2 | 20% disodium disulfate of Test No. 1, 80% sodium tripolyphosphate. | 56 |
| 3 | 10% disodium disulfate of Test No. 1, 90% sodium tripolyphosphate. | 41 |
| 4 | 100% sodium tripolyphosphate | 28 |

Commercial detergent formulations based on alkyl aryl sulfonate as the active detergent component when tested under same conditions and with like amounts of surface-active component give soil removal values of the same order of magnitude.

The composition above described may be desirably modified by the incorporation therein of additional builders. Thus, in certain applications, such as in tumbler type washing machines, wherein it is desirable to inhibit or prevent corrosion of the equipment by the detergent composition, a corrosion-inhibiting silicate builder, such as sodium metasilicate can be incorporated into the detergent composition to replace a portion of the phosphate builder. Accordingly, a suitable three-component composition can comprise, by weight, 10 to 40 parts polyoxypropylene disulfate, 90 to 60 parts of the phosphate builder, w. g., sodium tripolyphosphate; and 5 to 10 parts of the silicate builder. A specific example of a three-component composition contemplated by the invention is one composed of 20 parts disodium polyoxypropylene disulfate (molecular weight about 2000), 70 parts sodium tripolyphosphate, and 10 parts sodium metasilicate ($Na_2O:SiO_2$ ratio of 1:3.2).

Improved detergent compositions can be prepared by the addition of other builders to the three-component compositions mentioned above. These include additional alkaline salts which assist in cutting greases, such as the carbonates, e. g., sodium carbonate and sodium sesquicarbonate, and the sulfates, e. g., sodium sulfate.

An extensively used builder in detergent compositions is a soil suspending agent, which in clothes washing inhibits or prevents soil redeposition or so-called "tattle gray." Sodium carboxy methyl cellulose of low and medium viscosity can be employed for this purpose. Thus, a low viscosity sodium carboxy methyl cellulose, a 2% solution of which has a viscosity of 15–70 centipoises at 25° C. (by Brookfield), and a medium viscosity sodium carboxy methyl cellulose having a viscosity of 70–300 centipoises determined under like conditions, will be found satisfactory. In general the amount of sodium carboxy methyl cellulose is employed within a range of 0.5% to 5%, preferably 1% to 3%, by weight based on the total composition replacing sodium sulfate.

Excellent heavy duty detergent compositions may be formulated from the following ingredients within the ranges indicated, the parts being by weight:

| Ingredients | Parts |
|---|---|
| Polyoxypropylene glycol disulfate | 10 to 40 |
| Phosphate builder | 90 to 60 |
| Silicate | 5 to 10 |
| Carbonate | 5 to 10 |
| Sulfate | 5 to 20 |
| Sodium carboxy methyl cellulose | 1 to 5 |

Examples of specific heavy duty compositions are as follows, parts being by weight:

| Ingredients | Parts | Parts |
|---|---|---|
| Disodium polyoxyalkylene disulfate (M. W. 2,000) | 30 | 20 |
| Sodium tripolyphosphate | 30 | 40 |
| Tetrasodium pyrophosphate | 20 | 0 |
| Silicate | 5 | 10 |
| Sodium carbonate | 0 | 10 |
| Sodium carbosy methyl cellulose | 1 | 2 |
| Sodium sulfate | 16 | 18 |

Obviously many modifications and variations of the invention, as hereinbefore set forth, may be made without departing from the spirit and scope thereof and, therefore, only such limitations should be imposed as are indicated in the appended claims.

I claim:

1. Heavy duty detergent composition containing as essential components about 10 to 40 parts, by weight, of a surface-active polyoxypropylene glycol disulfate having a molecular weight from about 1000 to about 3000, and 90 to 60 parts, by weight, of an alkaline water-soluble calcium sequestering phosphate salt builder.

2. Composition according to claim 1 wherein the disulfate has a molecular weight from about 1500 up to 2500.

3. Composition according to claim 2 wherein the disulfate is disodium polyoxypropylene glycol disulfate and the phosphate is sodium tripolyphosphate.

4. Composition according to claim 1 which, in addition, contains 5 to 10 parts of sodium silicate as corrosion inhibiting builder.

References Cited in the file of this patent

UNITED STATES PATENTS

| 1,970,578 | Schoeller | Aug. 21, 1934 |
| 2,213,477 | Steindorff | Sept. 3, 1940 |
| 2,477,383 | Lewis | July 26, 1949 |
| 2,492,955 | Ballard | Jan. 3, 1950 |
| 2,606,202 | Lecher | Aug. 5, 1952 |